(12) United States Patent
Thomas

(10) Patent No.: US 7,159,898 B2
(45) Date of Patent: Jan. 9, 2007

(54) VEHICLE AIR BAG MODULE RETENTION SYSTEM

(75) Inventor: Scott David Thomas, Novi, MI (US)

(73) Assignee: General Motors Corporation, Detroit, MI (US)

( * ) Notice: Subject to any disclaimer, the term of this patent is extended or adjusted under 35 U.S.C. 154(b) by 311 days.

(21) Appl. No.: 10/828,422

(22) Filed: Apr. 20, 2004

(65) Prior Publication Data

US 2005/0230943 A1    Oct. 20, 2005

(51) Int. Cl.
*B60R 21/16*      (2006.01)
(52) U.S. Cl. ..................... 280/731; 200/61.55
(58) Field of Classification Search ............... 280/731, 280/728.2; 200/61.55, 61.54; 74/552
See application file for complete search history.

(56) References Cited

U.S. PATENT DOCUMENTS

| 4,800,775 | A | * | 1/1989 | Iuchi ........................... 74/552 |
| 5,327,796 | A | * | 7/1994 | Ernst et al. ................ 74/484 H |
| 5,593,178 | A | * | 1/1997 | Shiga et al. .................. 280/731 |
| 5,627,352 | A | * | 5/1997 | Suzuki et al. ............. 200/61.54 |
| 5,931,492 | A | * | 8/1999 | Mueller et al. ........... 280/728.2 |
| 6,036,223 | A | * | 3/2000 | Worrell et al. ............... 280/731 |
| 6,250,666 | B1 | * | 6/2001 | Ross ........................ 280/728.2 |
| 6,688,637 | B1 | * | 2/2004 | Igawa et al. ............. 280/728.2 |
| 6,871,870 | B1 | * | 3/2005 | Schneider et al. ........ 280/728.2 |
| 2002/0109337 | A1 | * | 8/2002 | Kassman et al. ......... 280/728.2 |

\* cited by examiner

*Primary Examiner*—Paul N. Dickson
*Assistant Examiner*—Drew J. Brown
(74) *Attorney, Agent, or Firm*—Laura C. Hargitt

(57) ABSTRACT

A steering wheel assembly includes an air bag module retention system that employs at least one spring. The at least one spring performs two functions. First, the at least one spring provides snap-fit engagement to retain the air bag module to the armature of the steering wheel. Second, the at least one spring biases the airbag module in a first position in which the air bag module "floats" a distance from the armature. The at least one spring is deformable when a driver depresses the air bag module so that the air bag module is movable to a second position to activate a horn circuit and cause horn actuation.

17 Claims, 4 Drawing Sheets

VEHICLE AIR BAG MODULE RETENTION SYSTEM

TECHNICAL FIELD

This invention relates to fastening elements for retaining an air bag module to a steering wheel armature, the fastening elements including a spring configured to provide snap-in retention of the air bag module to the steering wheel armature, to bias the air bag module in a first position in which a switch is open, and to deform with sufficient force to enable the air bag module to move to a second position in which the switch is closed.

BACKGROUND OF THE INVENTION

The prior art includes steering wheels in which a driver air bag "floats" relative to the steering wheel armature on a spring system, and moves toward the steering wheel when the air bag module is pushed, in the process closing one or more switches that activate a vehicle horn. The spring system holds the air bag module away from the steering wheel when the air bag module is not depressed.

The prior art includes snap-in driver air bag to steering wheel interfaces to reduce assembly costs. These prior art snap-in air bag modules use separate spring systems for the snap-in function and the floating horn function.

SUMMARY OF THE INVENTION

A steering wheel assembly for a vehicle is provided. The steering wheel assembly includes a steering wheel armature, an air bag module, an electrical switch, and an air bag module retention system. The retention system includes at least one foot and at least one spring. The at least one spring is sufficiently configured to retain the at least one foot in a snap-fit engagement thereby to fasten the air bag module to the armature. Furthermore, the at least one spring is sufficiently configured to bias the air bag module in a first position in which the switch is open, and the at least one spring is configured to deform upon sufficient application of force to the air bag module to allow movement of the air bag module to a second position in which the switch is closed. The switch may, for example, be operatively connected to the vehicle horn so that sufficient force exerted on the air bag module causes actuation of the vehicle horn.

Each spring of the air bag module retention system thus performs two functions. First, each spring enables snap-fit engagement of the air bag module to the steering wheel armature to facilitate air bag module installation. Second, each spring acts on the air bag module to cause the air bag module to "float" above the armature to maintain the switch in an open position, and each spring is deformable to allow the air bag module to move relative to the armature to close the switch.

The features for mounting the at least one spring and providing the at least one snap-in foot between the driver air bag and steering wheel armature may be integrally molded into the air bag module and steering wheel so that no extra parts are needed. Horn switches of numerous constructions can be placed at designated touch down points between the driver air bag module and steering wheel to activate the horn circuit when the driver air bag is depressed. The steering wheel assembly of the invention enables reduced tolerance stack-up and associated build variation that may be caused by intermediate pieces found in the prior art. The air bag module can be disengaged from the steering wheel armature by moving the at least one spring with a tool that is inserted into a slot in the outer show surface of the steering wheel.

The above features and advantages, and other features and advantages, of the present invention are readily apparent from the following detailed description of the best modes for carrying out the invention when taken in connection with the accompanying drawings.

DESCRIPTION OF THE PREFERRED EMBODIMENTS

Figure 1:
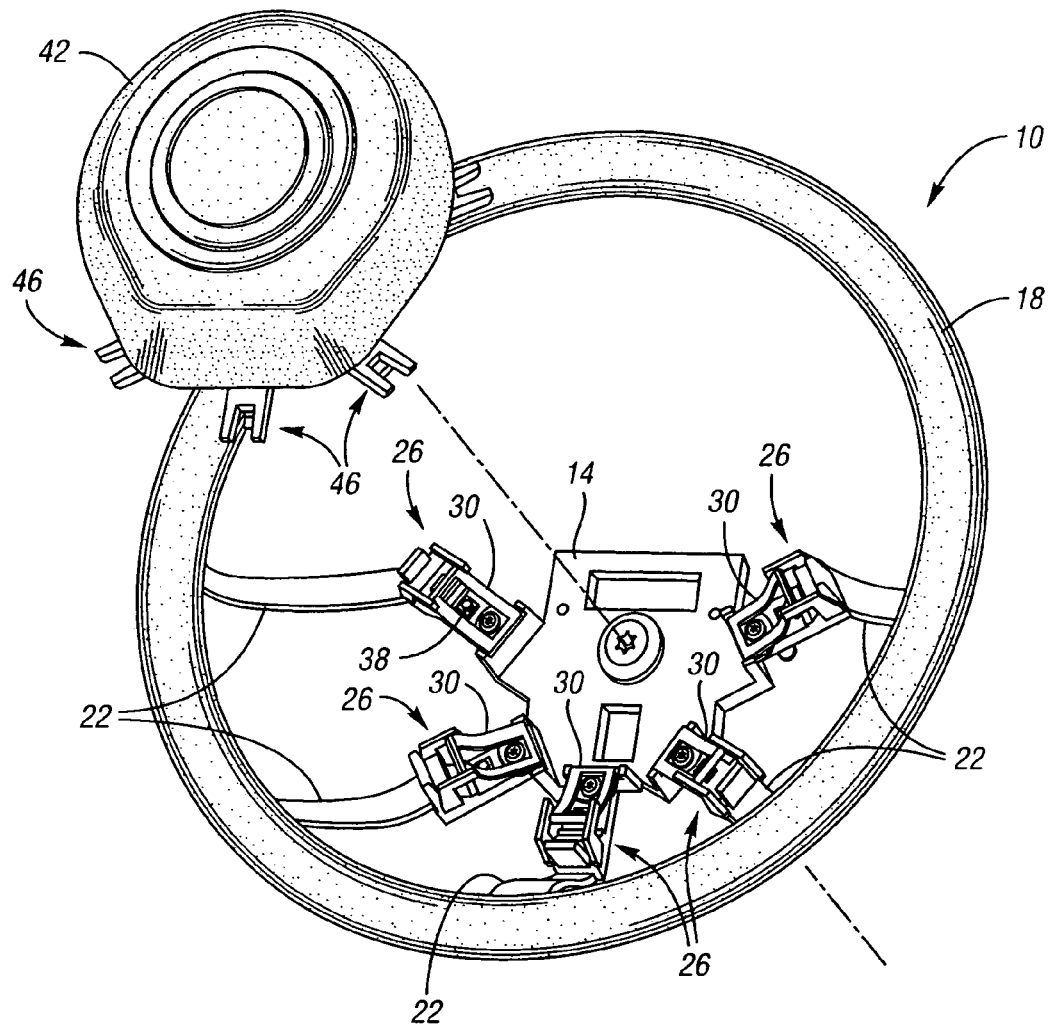
FIG. 1 is a schematic, partially exploded, perspective view of a portion of a steering wheel assembly having an armature including fastening elements thereon, and an air bag module including complementary fastening elements thereon.

Referring to FIG. 1, a steering wheel armature 10 includes a base 14, a rim 18 and a plurality of spokes 22 interconnecting the base and the rim. A plurality of fastening elements 26 is on the armature 10. Each fastening element 26 includes a spring element 30. A plurality of switches 38 is also mounted to the armature 10, each switch 38 being proximately located to a spring element 30. The switches 38 are electrically connected to a relay coil horn circuit (not shown) and activate a vehicle horn when closed.

Figure 2:
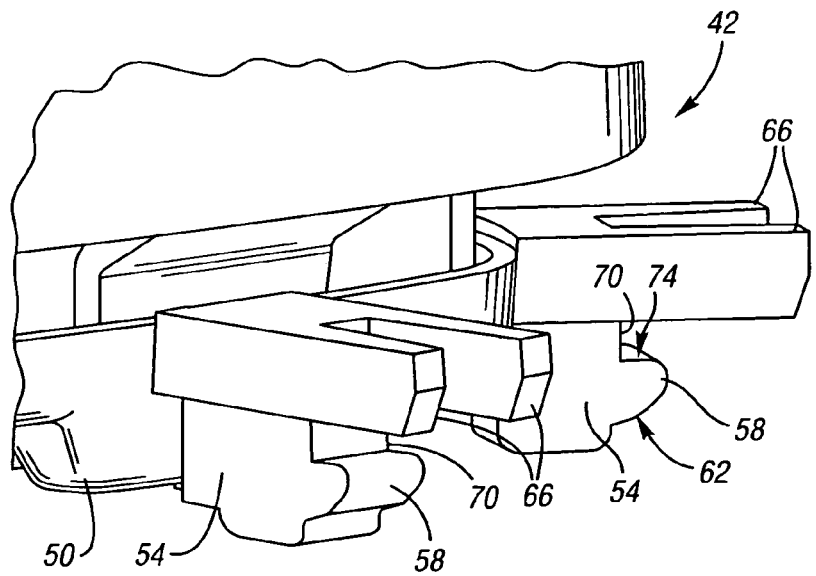
FIG. 2 is a schematic perspective view of complementary fastening elements of the air bag module of FIG. 1.

An air bag module 42 includes complementary fastening elements 46 that are engageable with the fastening elements 26 on the armature to provide snap-in engagement of the air bag module to the armature. The fastening elements 26 and complementary fastening elements 46 cooperate to form an airbag module retention system. Referring to FIG. 2, wherein like reference numbers refer to like components from FIG. 1, the air bag module 42 includes a structural member 50 to which the complementary fastening elements 46 are rigidly mounted. Each complementary fastening element 46 includes a main body portion 54. A snap-in foot 58 protrudes from the main body portion 54. Each snap-in foot 58 defines a lead-in surface 62, which is rounded in the embodiment depicted, but may be flat within the scope of the claimed invention. Each complementary fastening element 46 also defines two arms 66 extending outward from the main body portion 54 and from the air bag module 42. The arms 66 and the snap-in foot 58 define a notch 70 therebetween. Each foot 58 includes a generally planar surface 74 that partially defines the notch 70.

Figure 3:
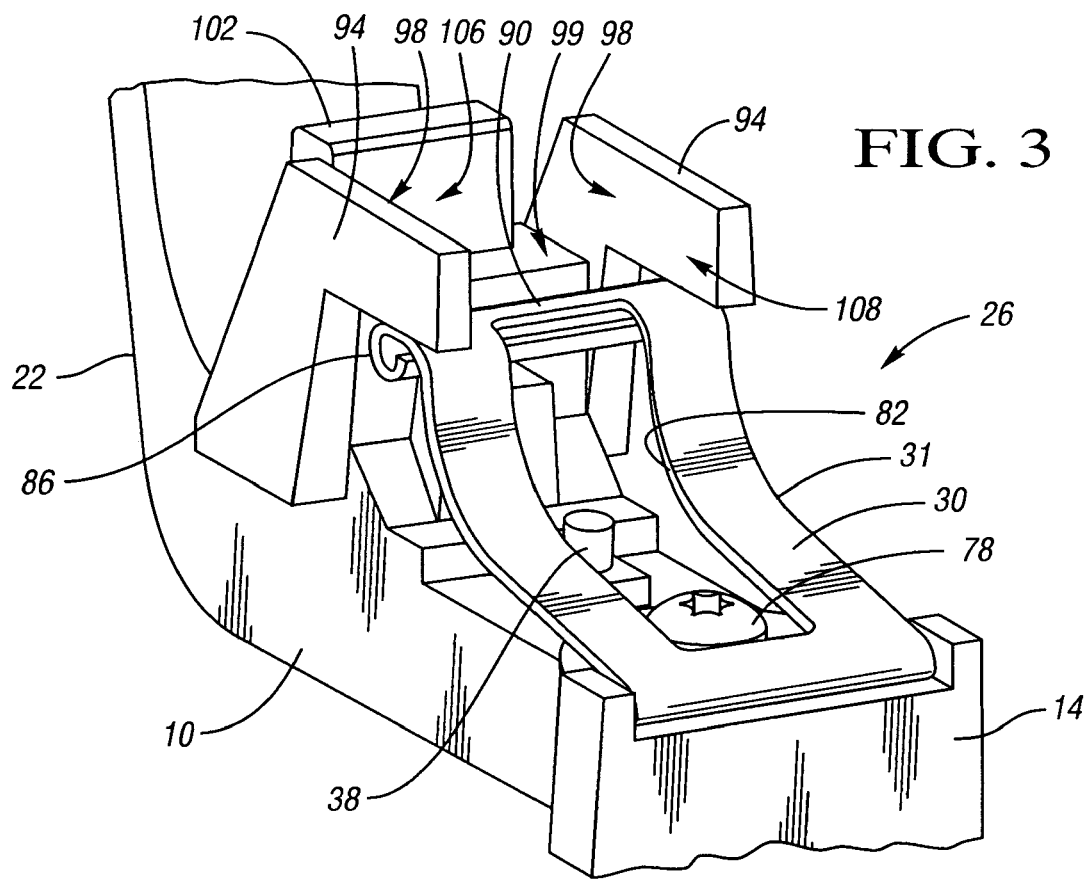
FIG. 3 is a schematic perspective view of a fastening element of the armature of FIG. 1.

Referring to FIG. 3, wherein like reference numbers refer to like components from FIGS. 1 and 2, a fastening element 26 on the steering wheel armature 10 is schematically depicted. Fastening elements 26 are substantially identical to one another. The fastening element 26 is situated where the base portion 14 and a spoke 22 intersect. The spring element 30 is mounted to the armature by a threaded fastener 78. The spring element 30 defines an elongated slot 82. The elongated slot 82 is characterized by a width that is greater than the width of the main body portion 54 of complementary fastening elements 46, as shown in FIG. 2. Spring element 30 is characterized by a curvature 31 along its length. A rolled end 86 of spring 30 closes off the elongated slot 82 and forms an engagement portion 90 of the fastening element 26. Integrally formed with spoke 22 are arms 94. Arms 94 form opposing surfaces 98 that are spaced a distance apart from one another. A portion 102 of the spoke forms a surface 106 that is generally perpendicular to opposing surfaces 98. Surfaces 98 and 106 define an open space 108 therebetween. Open space 108 is unobstructed in one direction for insertion of at least one member of the air bag module. More specifically, the open space 108 is sufficiently wide to accommodate the arms 66 of one of the complementary fastening elements 46 as shown in FIG. 2. The engagement portion 90 rests against the underside of arms 94.

In the context of the present invention, "inward" refers to the direction toward the armature, generally parallel to the axis of rotation of the steering wheel; "outward" refers to the direction opposite from the inward direction. "Lateral" refers to a direction that is generally perpendicular to the axis of rotation of the steering wheel. Thus, for example, the spokes 22 extend generally laterally from the base 14 to the rim 18.

Figure 4:
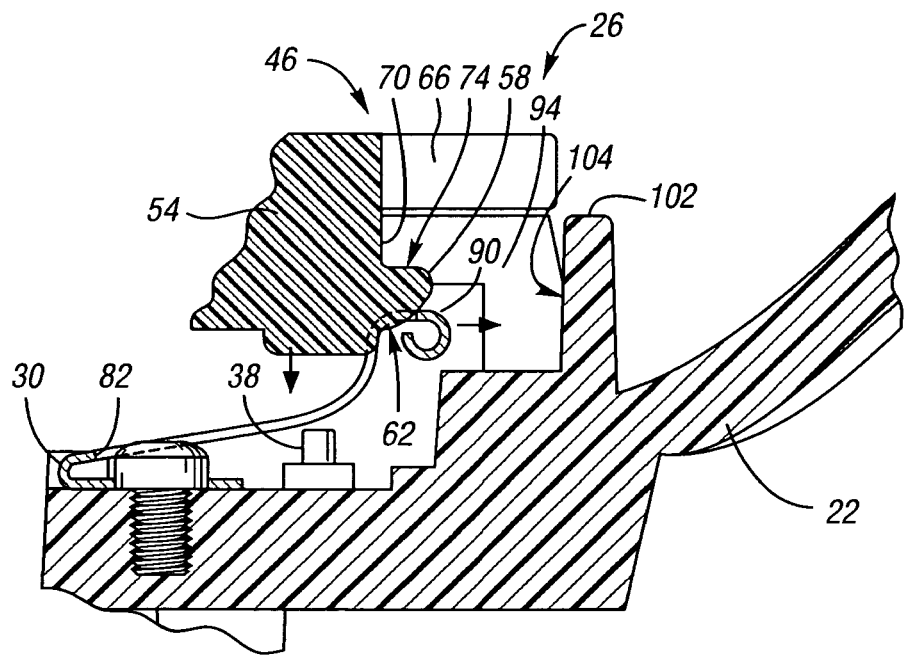
FIG. 4 is a sectional view of the fastening element of FIG. 3 in an engagement scenario with one of the complementary fastening elements of the air bag module of FIG. 1.
Figure 5A:
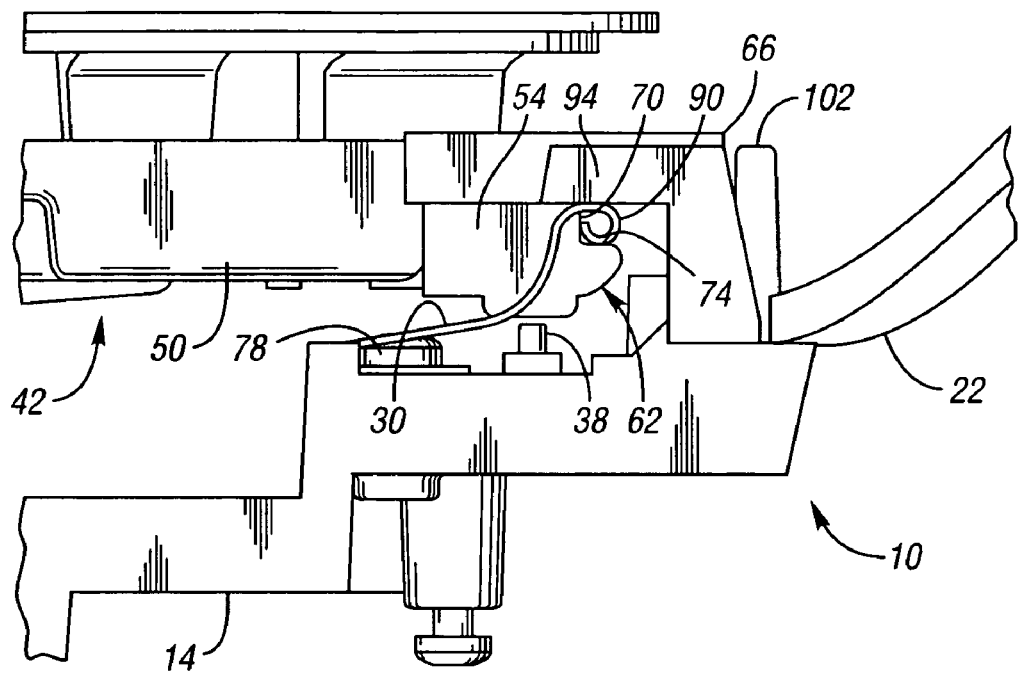
FIG. 5a is a schematic side view of the fastening element and complementary fastening element of FIG. 4 fully engaged with one another and with the air bag module in a first position with respect to the armature.

Referring to FIG. 4, wherein like reference numbers refer to like components from FIGS. 1–3, a complementary fastening element 46 is depicted in a snap-fit engagement scenario with fastening element 26. As the complementary fastening element 46 engages fastening element 26, the lead-in surface 62 of the snap-in foot 58 contacts engagement portion 90 of spring element 30. While the engagement portion 90 in the embodiment depicted is a unitary part of the spring element, it is within the scope of the claimed invention for an engagement portion to be an intermediate piece that is operatively connected to a spring element 30. The lead-in surface 62 contacts the engagement portion 90 at an angle to cause lateral movement of the engagement portion 90 during inward movement of complementary fastening element 46, with resultant deformation of spring 30. The main body 54 of the complementary fastening element 46 extends through the slot 82 of spring element 30 during snap-fit engagement. Continued inward movement of complementary fastening element 46 causes the engagement portion 90 to move along the lead-in surface 62 until it reaches notch 70, as shown in FIG. 5a. It may be desirable for the foot 58 and arms 66, or the spring element 30, to include a low friction coating to facilitate relative movement between the engagement portion and the lead-in surface 62, and thereby reduce insertion force required for snap-fit engagement.

Referring to FIG. 5a, wherein like reference numbers refer to like components from FIGS. 1–4, the air bag module 42 is depicted in a first position in which the air bag module 42 is fastened to the armature 10 of the steering wheel. The notch 70 permits the spring element 30 to return to its original shape. The spring acts against the arms 66 of the complementary fastening element 46 to suspend the main body portion 54 a distance from horn switch 38 and thereby cause the air bag module 42 to "float." Planar surface 74 is oriented at a right angle to the outward direction to prevent engagement portion 90 from leaving the notch 70. At least one member is connected to, or part of, the armature 10 or the air bag module 42, and is configured to restrict movement of the engagement portion 90 thereby to restrict outward movement of the air bag module 42 with respect to the armature. In the embodiment depicted, engagement portion 90 contacts the arms 94, which restrict outward movement of the engagement portion.

Outward movement of the air bag module requires outward movement of the planar surface 74. Outward movement of the planar surface in turn requires outward movement of the engagement portion, which is restricted in its outward movement by arms 94. Thus, arms 94 and engagement portion 90 act to retain the air bag module to the armature 10 by restricting outward movement of each complementary fastening element 46.

Figure 5B:
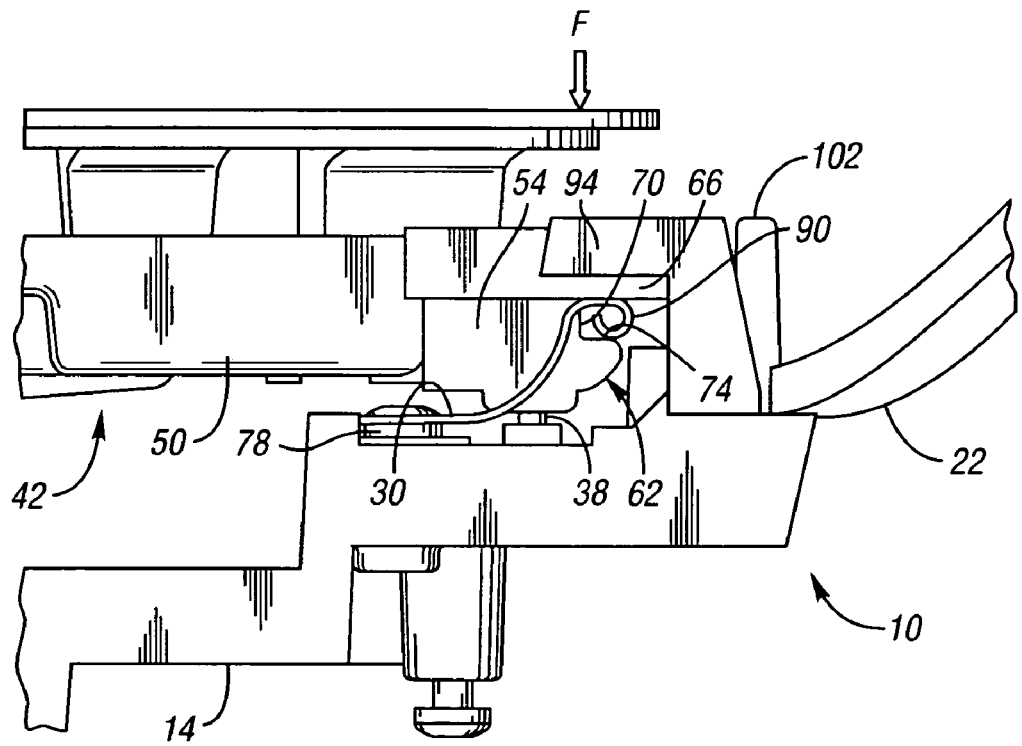
FIG. 5b is a schematic side view of the fastening element and complementary fastening element of FIG. 5a with the air bag module in a second position with respect to the armature.
Figure 6:
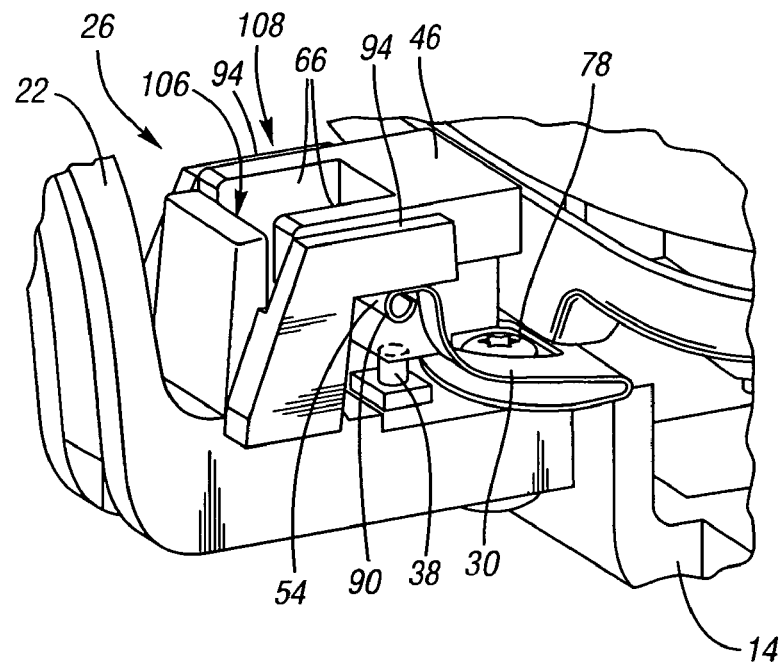
FIG. 6 is a schematic perspective view of the fastening element and complementary fastening element of FIGS. 5a and 5b.

Referring to FIG. 6, wherein like reference numbers refer to like components from FIGS. 1–5a, arms 66 of the complementary fastening element 26 are in the open space 108 between the arms 94 of the fastening element 26 so that surfaces (shown at 98 in FIG. 3) of the arms 94 prevent movement of the air bag module in first and second lateral directions to prevent rotation of the airbag module. Thus, the air bag module retention system includes surfaces 98 configured to prevent rotation of the air bag module with respect to the steering wheel armature by restricting relative movement between at least one member, i.e., arms 66, and surfaces 98. Similarly, surface 106 restricts movement of the arms 66 in a third lateral direction to prevent radial movement of the airbag module with respect to the steering wheel armature. In the context of the present invention, a "member" may or may not be a unitary portion of the steering wheel armature or the air bag module. Similarly, a "member" may or may not be a separate piece operatively connected to the armature or the air bag module.

Referring to FIG. 5b, a force F exerted on the air bag module 42 is transmitted via arms 66 to the engagement portion 90 of the spring element 30. The force causes spring element 30 to elastically deform and causes inward movement of the air bag module 42 so that the lower surface of the main body portion 54 presses the switch 38, thereby completing the relay coil horn circuit to actuate the vehicle horn. When force F is removed from the air bag module, the spring element 30 exerts an outward force on the air bag module 42 via arms 66 to return to the first position as shown in FIG. 5a. It may be desirable to include a surface, shown at 99 in FIG. 3, that functions as a travel stop by restricting inward movement of the air bag module 42 to limit the amount of force that may be applied to switch 38. Surface 99 restricts inward movement of arms 66.

In the embodiment depicted, the horn switches 38 are push button switches interconnected by a flexible printed circuit board (not shown). However, those skilled in the art will recognize a variety of switch configurations that may be employed within the scope of the claimed invention. In the context of the present invention, a "switch" includes any two conductive elements that are selectively separable to open a circuit and matable to close a circuit. For example, a switch may comprise a battery "hot" contact located on an electrically-isolated intermediate piece on the air bag module 42, and a grounded contact located on the armature, or vice versa; the battery contact and the ground contact would be sufficiently positioned to touch one another when the air bag module is depressed, thereby closing the switch to actuate the horn. Similarly, the air bag module 42 and/or the armature 10 may form a switch. For example, the structural member 50 of the air bag module may be a conductive material and may be wired to be a "hot" contact, the armature 10 may be grounded, or vice versa. The armature 10 and the structural member 50 would thus form a switch that is closed when the air bag module is depressed to cause contact between the structural member 50 and the armature 10. Those skilled in the art will recognize that the use of electrical insulators would be desirable to electrically isolate the armature and the structural member 50 to prevent horn actuation when the air bag module is not depressed. The use of a membrane switch may also be desirable. Electrical isolators between the airbag module inflator and the structural member 50 may be required for some of the switch configurations.

It should be noted that the feet 58 do not extend through a hole in the armature 10 for snap-fit engagement. It should also be noted that the armature 10, including arms 94 and portion 102, is designed with a sufficient shape so that only an upper and lower tool is required to manufacture the armature, i.e., there is no die lock condition and hence no slides or lifters are necessary in the casting or molding tools. Similarly, the air bag structural member 50 and the complementary fastening elements 46 are designed with a sufficient shape so that only an upper and lower tool is required to manufacture the structural member and the fastening elements 46, i.e., no slides are necessary in the casting or molding tools.

The air bag module can be released from the armature by removing the engagement portion 90 from the notch 70, such as with a tool. Within the scope of the claimed invention, the spring elements 30 may be mounted with respect to either the armature of the steering wheel or to the air bag module prior to assembly of the air bag module to the armature. The complementary fastening elements 46 are preferably integrally molded or cast as unitary parts of the air bag module structural member 50 or the steering wheel armature 10. Similarly, arms 94 and surface 106 are preferably integrally molded or cast as unitary parts of the steering wheel armature 10 or the airbag module 42. Squeak and rattle reducers are preferably employed to minimize noise that may be created by relative movement of the air bag module with respect to the armature.

Those skilled in the art will recognize a variety of spring element 30 configurations that may be employed within the scope of the claimed invention. For example, the spring element 30 may be a torsion spring formed by a wire and having two legs and a loop between the two legs to reduce the bending moment of the spring. It may be desirable for the spring element to include a piece or a coating of zinc to reduce or eliminate galvanic corrosion of the spring element.

Figure 7:
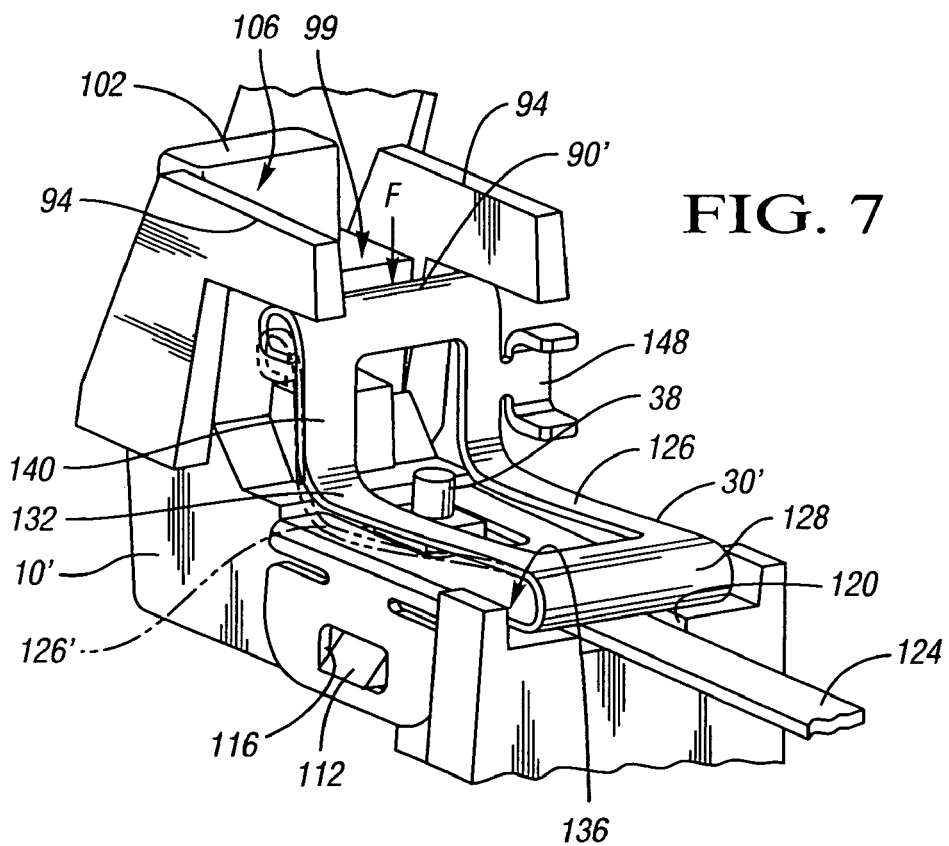
FIG. 7 is a schematic perspective view of an alternative armature and spring element configuration.

Referring to FIG. 7, an alternative embodiment of a fastening element on armature 10' is schematically depicted. The armature 10' includes snap-fit protrusions 112 that are engageable with holes 116 in spring element 30' to retain spring element 30' to the armature 10', thereby eliminating the need for the threaded fastener 78 of FIG. 3. Armature 10' also includes a notch 120 through which a portion of a conductive path for the horn circuit, namely flexible printed circuit board 124, is routed to connect the switch 38 to the relay coil horn circuit. The notch 120 is positioned so that the spring element 30' retains the switch 38 and the portion of the circuit board 124 when the spring element 30' is snap-fit to the armature 10'. Likewise, the notch 120 could be formed in the spring element 30' to retain the printed circuit board.

Spring element 30' is characterized by two curved portions 128, 132. Spring element portion 126 interconnects curved portions 128, 132, and extends generally parallel to reaction surface 136. Spring element portion 140 interconnects curved portion 132 and engagement portion 90', and extends generally perpendicular to portion 126. Spring element portion 126 is configured so that, during snap-fit engagement of a foot, an insertion force F is transmitted to engagement portion 90' and spring element portion 140 to cause deformation of the spring element 30' such that portion 126 contacts reaction surface 136 (as shown in phantom at 126'), which restricts inward movement of the engagement portion 90', causing increased lateral movement of engagement portion 90' during snap-fit engagement of a foot. The reaction surface 136 may be on the spring element 30, the armature 10, an intermediate piece, etc.

Spring element 30' includes a C-shaped feature 148 engageable by a tool (not shown) to deflect the spring element 30' and cause lateral movement of engagement portion 90' to release a foot. It may be desirable to include a "helper spring" that biases the air bag module outward so that disengagement of the air bag module from the armature is facilitated. Engagement portion 90' includes a substantially flat surface for improved engagement with planar surface 74 of notch 76, depicted in FIGS. 2–5b.

Referring again to FIG. 1, the plurality of spring elements are preferably spaced and configured so that the sum of the vectors of the spring forces exerted on the airbag module equals zero. In other words, the spring elements 30 are located on the armature so that the lateral forces exerted by the spring elements on the air bag module cancel each other out. Alternatively, a guide could be used to restrict the movement of the air bag module to the inward and outward direction. For example, holes formed in the armature 10 may receive rods on the airbag module in a close-fit relationship, allowing inward and outward movement of the rods and air bag module, but limiting or preventing lateral movement of the air bag module. If such a guide is employed, it may be desirable for the "helper springs" referred to above to be coiled around the rods to support the helper springs.

The plurality of spring elements 30 may be formed from a single piece of material so as to be interconnected for facilitated handling and installation to the steering wheel armature or to the air bag module.

While the best modes for carrying out the invention have been described in detail, those familiar with the art to which this invention relates will recognize various alternative designs and embodiments for practicing the invention within the scope of the appended claims.

The invention claimed is:
1. A steering wheel assembly comprising:
an armature, an air bag module, an electrical switch, and an air bag module retention system including at least one foot and at least one spring having at least one engagement portion; wherein said at least one engagement portion is sufficiently configured to retain said at least one foot in a snap-fit engagement thereby to fasten the air bag module to the armature; wherein said at least one spring is sufficiently configured to bias the air bag module in a first position in which the switch is open; and wherein said at least one spring is configured to deform upon sufficient application of force to the air bag module thereby to allow movement of the air bag module to a second position in which the switch is closed.

2. The steering wheel assembly of claim 1, wherein the retention system further includes at least one surface and at least one member, and wherein said at least one surface is sufficiently configured and positioned to prevent rotation of the air bag module with respect to the armature by restricting relative movement between said at least one member and said at least one surface.

3. The steering wheel assembly of claim 2, wherein said at least one surface is sufficiently configured and positioned to prevent radial movement of the air bag module with respect to the armature by restricting relative movement between said at least one member and said at least one surface.

4. The steering wheel assembly of claim 1, wherein said at least one spring defines a slot for receiving said at least one foot during snap-fit engagement of said at least one foot.

5. The steering wheel assembly of claim 1, wherein said at least one foot defines a lead-in surface and a notch; wherein said at least one engagement portion is operatively connected to said at least one spring; and wherein the air bag module retention system is sufficiently configured so that the air bag module is operatively connectable to the armature by (1) causing the lead-in surface of said at least one foot to contact a respective one of said at least one engagement portion, and (2) exerting a force on the air bag module to cause deformation of said at least one spring and movement of said at least one engagement portion along the corresponding lead-in surface and into the corresponding notch.

6. The steering wheel assembly of claim 5, further comprising a reaction surface, and wherein the spring is sufficiently configured so that, when said force is exerted on the airbag module, a portion of the spring deflects to contact the reaction surface to restrict inward movement of the portion of the spring during insertion.

7. The steering wheel assembly of claim 1, wherein the airbag module retention system includes at least one member sufficiently positioned to restrict outward movement of said at least one engagement portion thereby to restrict outward movement of the air bag module.

8. The steering wheel assembly of claim 1, wherein one of the airbag module and the armature is configured for snap-fit engagement with said at least one spring prior to assembly of the airbag module and the armature.

9. The steering wheel assembly of claim 1, wherein said at least one spring includes a feature attached thereto for engagement with a tool to deflect the spring element.

10. The steering wheel assembly of claim 1, further comprising a conductive pat for a horn circuit operatively connected to said at least one switch; wherein one of the armature and the air bag module defines a notch through which a portion of the conductive path extends; and wherein said at least one spring and the armature cooperate to retain the portion of the conductive path in the notch.

11. The steering wheel assembly of claim 1, further comprising a travel stop to restrict inward movement of the air bag module to thereby limit the force that may be applied to said switch.

12. The steering wheel assembly of claim 1, wherein the steering wheel armature is sufficiently shaped so that it is formable.

13. The steering wheel assembly of claim 1, wherein the air bag module includes a structural portion, and wherein the structural portion is sufficiently shaped so that it is formable.

14. A method of assembling a steering wheel comprising:

configuring a steering wheel armature to support a horn switch and to receive an air bag module;

employing at least one spring element to provide a snap-fit retention of said air bag module to the steering wheel armature, said at least one spring element configured to bias the air bag module in a first position in which a switch is open, and configured to allow selective movement of the air bag module to a second position with respect to the armature to close the switch; and assembling said air bag module to said steering wheel armature via the said snap-fit retention provided by said at least one spring element; wherein one of the air bag module and the armature is configured for snap-fit engagement to said at least one spring element prior to said assembling said air bag module to said steering wheel armature; wherein the method further comprises connecting said horn switch and a conductive path to said armature, the conductive path being operatively connected to said horn switch; and wherein snap-fit engagement of said at least one spring element to the armature prior to said assembling said air bag module to said steering wheel armature provides retention of said horn switch and the conductive path to said armature.

15. The method of claim 14, wherein said armature is moldable or castable.

16. The method of claim 14, wherein said air bag module includes a moldable or castable structural portion.

17. A steering wheel assembly comprising:

an armature, an air bag module, an electrical switch, and an air bag module retention system including at least one foot and at least one spring, wherein said at least one spring is sufficiently configured to retain said at least one foot in a snap-fit engagement thereby to fasten the air bag module to the armature, wherein said at least one spring is sufficiently configured to bias the air bag module in a first position wherein the switch is open, and is configured to deform upon sufficient application of force to the air bag module thereby to allow movement of the air bag module to a second position wherein the switch is closed;

wherein the retention system further includes at least one surface and at least one member, and wherein said at least one surface is sufficiently configured and positioned to prevent rotation of the air bag module with respect to the armature by restricting relative movement of said at least one member with respect to said at least one surface; and wherein said at least one foot defines a lead-in surface and a notch; wherein the air bag module retention system further includes at least one engagement portion operatively connected to said at least one spring; and wherein the air bag module retention system is sufficiently configured so that the air bag module is operatively connectable to the armature by (1) causing the lead-in surface of said at least one foot to contact a respective one of said at least one engagement portion, and (2) exerting a force on the air bag module to cause detonation of said at least one spring and movement of said at least one engagement portion along the corresponding lead-in surface and into the corresponding notch.

* * * * *